3,318,782
PURIFICATION OF ENZYMES
John T. Garbutt, Muscatine, Iowa, assignor to Grain Processing Corporation, Muscatine, Iowa, a corporation of Iowa
No Drawing. Filed May 6, 1964, Ser. No. 365,520
6 Claims. (Cl. 195—66)

This invention relates to the treatment of starch hydrolyzing enzyme preparations and to an improved enzymatic process for the production of hydrolyzates of starch and starch products having exceptionally high dextrose content.

Although the presence of starch hydrolyzing enzymes is widespread within the plant and animal kingdom, sources of microbiological origin are used most commonly in industry in the enzymatic saccharification of liquefied starch to form dextrose-containing syrups. The culture filtrates of *Aspergillus phoenicis*, *Aspergillus diastaticus*, *Aspergillus usamii* and *Aspergillus niger* produce excellent enzyme systems which hydrolyze liquefied starch to dextrose. Cultures of *Aspergillus niger* are particularly advantageous.

The broth resulting from the fermentation of these organisms generally contains several enzymes having different activities, some of which interfere with the production of dextrose when the enzyme preparation is employed to hydrolyze starch. Thus, for example, in the culture broth of *Aspergillus niger* three predominant enzyme systems have been identified, namely, alpha-amylase, glucamylase (amyloglucosidase) and transglucosidase. Alpha-amylase attacks the whole starch granule and breaks it down into a dispersed colloidal mass. This dispersion contains a linear fraction from amylose of polymerized dextrose attached in the alpha-1,4-positions and a branch polymer from amylopectin which also contains alpha-1,4-linkages but in addition has branched positions adjoining with alpha-1,6-linkages. After liquefaction, additional contact of alpha-amylase with these fractions reduces the molecular size appreciably and causes a desirable reduction in viscosity.

In contrast to the multi-chain action of alpha-amylase, the action of glucoamylase is thought to be a "single-chain" action where an enzyme molecule attaches to the dextrin before detaching and attacking another dextrin. The action of glucoamylase on dextrin polymers is much more specific at the alpha-1,4-glucosidic bonds than at the alpha-1,6-glucosidic bonds in that it will cleave the former type bond approximately 30 times as fast as the latter type bond. The glucoamylase action thus results in the formation of dextrose.

The presence of transglucosidase with glucoamylase in enzyme preparations detracts from the potential yield of dextrose in the hydrolyzate. Transglucosidase is known to catalyze transglucosylation reactions between dextrose, maltose and other intermediate saccharified products. As a result, upon completion of the saccharification reaction saccharides other than dextrose are still present in substantial amounts.

Accordingly it is highly desirable to separate the desired glucoamylase enzyme from other enzymes, principally transglucosidase, present in fungal enzyme preparations which, in the hydrolysis of starch, interfere with the formation of dextrose.

The present invention provides a process for purifying glucoamylase-containing fungal enzyme preparations to separate therefrom enzymes which, in the hydrolyzation of starchy materials, interfere with the production of dextrose. The present invention also provides a process of hydrolyzing starch to obtain high yields of dextrose by subjecting a liquefied starchy material to the action of a purified glucoamylase-containing fungal enzyme preparation from which there has been removed those enzymes which interfere with the production of dextrose.

In accordance with the present invention, a glucoamylase-containing fungal enzyme preparation is purified by subjecting said preparation to filtration with a hydrophilic water-insoluble dextran polymer gel comprising a three dimensional macroscopic network of cross-linked dextran substances. Gel materials of this type and methods of making the same are described in British Patent No. 854,715. These gel materials are commercially available in a variety of grades based on pore size from AB Pharmacia, Uppsala, Sweden, under the trade name "Sephadex." The "Sephadex" materials which are uniquely suitable for use in the present invention are those having water regain values of greater than about 7.5. Water regain value expresses grams of water imbibed per gram of dried gel and is indicative of the relative porosity of gels synthesized in the same manner, that is, with the same basic structure. The method used to determine water regain value is described in "Dextran Gels and Their Application in Gel Filtration" by Per Flodin, 1962, Meijels Bokindustri which is available from AB Pharmacia, Uppsala, Sweden. The procedure is as follows: A gel is allowed to swell in water for 24 hours. About 10 milliliters is then transferred into a weighed adaptor which is placed in a centrifuge tube. The adaptor is composed of a short plastic tube small enough in diameter to fit inside a centrifuge tube. The plastic tube bears a flange at the top, to support the adaptor on the top of the centrifuge tube, and a 400 mesh nylon net across the bottom. Liquid in the void space is centrifuged down through the filter at 1,000 to 2,000 revolutions per minute for 20 minutes (radius 15 cm.). The adaptor with its contents is then weighed and the contents transferred to a beaker and dried to constant weight at 105° C. The water regain is expressed as grams of water imbibed per gram dry gel. Water regain values for Sephadex G–100 and G–200 are 10±1 and 20±2, respectively.

Purification of the fungal enzyme preparation is conveniently accomplished by placing the dextran gel filter material in a chromatograph type column and filling the column with water. A liquid glucoamylase containing fungal enzyme preparation is then introduced into the column and permitted to percolate therethrough. Thereafter the column is eluted with a suitable eluant such as distilled water, aqueous salt solutions and the like. The first product percolate obtained is an impure mixture of glucoamylase and transglucosidase from which objectionable color and other impurities have been removed to a significant extent. After removal of this percolate, a substantially pure glucoamylase product is recovered by further purging the column with a suitable eluant.

The filtration can be carried out at temperatures conducive to enzyme stability and can be as high as about 60° C. Filtration is preferably carried out a pH from about 2 to 5. At higher pH values, the rate of filtration decreases thereby extending the time required for purification.

The solids concentration or viscosity of the enzyme preparation is not particularly important, provided, of course, that it is capable of being handled in the equipment utilized. With high solids content, the filtration times are longer. In some instances, this can be improved by introducing the fungal enzyme preparation and eluant at the bottom of the column and permitting them to flow up through the column under the application of adequate pressure. Preferably the enzyme preparation is introduced into the filtration column in amounts corresponding to about 20 to 25% of the volume of the column.

An unexpected feature of the present invention is that upon filtration the dextran polymer gels resolve the fungal enzyme preparation into two glucoamylase fractions, one fraction containing glucoamylase and transglucosidase and a second fraction of substantially pure glucoamylase. Based on known molecular sieve separation technology one would expect the glucoamylase enzyme (reported molecular weight of about 97,000) to elute from the column first, followed by the transglucosidase enzyme (molecular weight of about 30,000). However, this is not the case when glucoamylase-containing fungal enzyme preparations are purified by contacting with the Sephadex gels. The first product eluant or percolate from the Sephadex gel filtration column is an impure mixture of transglucosidase and glucoamylase and this is followed by the glucoamylase enzyme free of transglucosidase. It can be postulated that this phenomenon occurs due to the transglucosidase forming some type of complex with a portion of the glucoamylase, with the complex having a molecular weight greater than either of the individual enzymes and migrating through the gel as a single species. This, however, is a postulation and there is no wish to be bound thereby if in fact this unexpected phenomenon is attributable to other causes.

In the process of the invention approximately 50% of the glucoamylase activity present in the original sample can be recovered free of transglucosidase, objectionable color, contaminant salts and other impurities. The remaining 50% of the glucoamylase enzyme activity can be obtained free of color and other impurities but together with substantially all of the transglucosidase activity. Both enzyme fractions can be effectively utilized in the breakdown of starch. The pure glucoamylase fraction is admirably adapted for the production of high purity dextrose while the fraction containing both glucoamylase and transglucosidase can be used in the production of corn syrup or other low dextrose equivalent (D.E.) products. The absence of color and soluble solids in both of these enzyme fractions is patentably beneficial since these materials must eventually be removed from the dextrose and low D.E. products if present therein.

The process of the invention is applicable to the purification of glucoamylase-containing fungal enzyme preparations to remove therefrom transglucosidase. Accordingly, glucoamylase-containing culture filtrates of *Aspergillus phoenicis, Aspergillus diastaticus, Aspergillus usamii, Aspergillus niger* and *Rhizopus delemar* can be advantageously treated by the process of the invention.

The advantages of the invention will be further illustrated by the following specific examples. In these examples enzymes were evaluated for ability to hydrolyze starch. For the hydrolysis a slurry of corn starch is adjusted to approximately 27% solids level at pH 6–7 and liquefied with bacterial alpha-amylase to a dextrose equivalent (D.E.) from about 20 to 38. A gram 50 gram aliquot of the liquefied slurry is adjusted to pH 4.3 and placed in a 250 milliliter flask and there is added thereto one glucoamylase unit per 6 grams of starch. The flasks are stoppered and placed on a shaker in a 60° water bath. About 10 milliliter samples are taken at intervals for dextrose equivalent determinations using standard procedures.

Transglucosidase activity was estimated qualitatively utilizing thin layer chromatography by the detection of isomaltose and panose resulting from the action of transglucosidase on a maltose substrate. This method consists essentially of two steps: (1) the reaction of the enzymes on maltose, and (2) detection of the reaction products formed by thin layer chromatography. The relative amount of transglucosidase in a given sample is determined by visually comparing the color density of the isomaltose and panose spots with those obtained with a transglucosidase-free preparation and a corresponding untreated fungal amylase material. The sugars present are detected by the action of ammoniacal silver nitrate which produces a brown to black color on heating of the chromatoplate.

*Example I*

Approximately 200 milliliters of a Sephadex G–100 gel was placed in a 1″ x 15″ filtration column. Five milliliter samples of reconstituted glucoamylase-containing enzyme preparations of various solids concentrations and viscosities were introduced into the column at a pH of about 2.5. Elution of the column was carried out with distilled water. The following results were obtained:

| Sample Viscosity, cp. | Sample Solids, Percent | Recovery of original glucoamylase free of transglucosidase, percent |
| --- | --- | --- |
| 3.7 | 23.7 | 93 |
| 9.5 | 36.4 | 92 |
| 24.7 | 42.2 | 94 |

*Example II*

A 1″ x 15″ filtration column was filled with approximately 250 milliliters of a Sephadex G–100 gel. A reconstituted glucoamylase-containing enzyme solution at a pH of 2.5 was introduced into the bottom of the gel column.

In all cases the transglucosidase fraction eluted from the column first, followed by a mixture of transglucosidase and glucoamylase, and then a pure glucoamylase fraction. The results obtained using various enzyme volumes were as follows:

| Ratio enzyme volume to gel volume | Enzyme fraction | Recovery of glucoamylase | D.E. produced by enzyme fraction at— | |
| --- | --- | --- | --- | --- |
| | | | 47 hours | 71 hours |
| | Unpurified | 100 | 91.4 | 93.3 |
| 0.10 | I[1] | 0 | | |
| | II | 73.4 | 95.9 | 97.55 |
| 0.20 | I | 24.8 | 95.2 | 94.4 |
| | II | 62.9 | 96.5 | 98.1 |
| 0.25 | I | 31.4 | 94.1 | 93.9 |
| | II | 55.2 | 95.8 | 98.0 |
| 0.30 | I | 68.6 | 95.3 | 97.2 |
| | II | 17.6 | 96.0 | 98.8 |
| 0.40 | I | 81.1 | 94.4 | 94.75 |
| | II | 18.1 | 96.1 | 98.8 |

[1] Fraction I was the mixture of glucoamylase with transglucosidase and II was pure glucoamylase.

It will be noted that with enzyme volumes of 30% and 40% of the gel volume, the percentage of the glucoamylase which eluted from the column together with the transglucosidase was quite high. Thus, to improve the recovery of the pure glucoamylase it is preferred to employ an enzyme volume of not more than about 25% that of the gel volume. The pure glucoamylase fractions produced excellent dextrose equivalent values in starch hydrolyzates at 71 hours.

*Example III*

A 4″ x 12″ filtration column was filled with about 2,500 milliliters of Sephadex G–100 gel. A glucoamylase-containing enzyme preparation at a pH of about 2.5 was introduced at the bottom of the column. In this case 22.3% of the original glucoamylase was recovered in mixture with transglucosidase and 60.9% as pure glucoamylase.

*Example IV*

Approximately 75 milliliters of a Sephadex G-100 gel were placed in a 1″ x 6″ filtration column. The pH of the gel was adjusted to various levels by passing distilled water containing sulfuric acid through the column until the effluent attained the same pH value as the influent. Twenty milliliter samples of reconstituted glucoamylase-containing enzyme preparations were adjusted to the same pH levels as the column and introduced into the columns. The samples were eluted with distilled water and adjusted to the same pH level as the column.

At pH 1.8 the transglucosidase and a large part of the glucoamylase had been inactivated so that only 18.3% of the original glucoamylase activity was recovered.

At pH 2.5 the first portion of enzyme activity eluted from the column was a mixture of glucoamylase and transglucosidase representing 62.7% of the original glucoamylase. The second portion was largely glucoamylase and amounted to 32.7% of the original glucoamylase.

At pH 4.2 the first fraction was a mixture of glucoamylase and transglucosidase representing 67.2% of the original glucoamylase. The second fraction was mainly gluocoamylase and contained 20.4% of the original glucoamylase. A third fraction was mainly transglucosidase. Saccharification tests gave the following results:

| Enzyme Sample | D.E. at— | | |
|---|---|---|---|
| | 44 hours | 68 hours | 92 hours |
| Untreated | 86.1 | 87.5 | 89.1 |
| Glucoamylase purified at pH 2.5 | 89.2 | 89.9 | 90.7 |
| Glucoamylase purified at pH 4.2 | 90.8 | 92.0 | |

Similar runs were made at pH 4.2, 5.0, and 6.0. It was found that separation of the transglucosidase was possible at the higher pH levels but there was no decided improvement over pH 4.2.

*Example V*

A sample of Sephadex G-100 was allowed to swell in distilled water for several days and fines removed by decanting the supernatant several times. The gel was placed in a 4″ x 24″ filtration column in dilute suspension so that any bubbles could rise to the surface. After the column was filled, the feed line was connected to a source of distilled water which was utilized as eluant. A sample of 300 milliliters of a reconstituted glucoamylase-containing enzyme preparation was fed to the top of the column from a separatory funnel.

The results of the purification are shown in the following table:

| Sample No. | Sample description | Color | Solids, percent of total | Glucoamylase recovery, percent | D.E. at— | | |
|---|---|---|---|---|---|---|---|
| | | | | | 44 hrs. | 68 hrs. | 94 hrs. |
| 1 | Some GA,[1] strong TG [1] | None | 1.9 | 9.5 | 75.4 | 79.4 | 81.4 |
| 2 | Some GA, strong TG | do | 1.9 | 7.9 | 91.0 | 90.7 | 88.9 |
| 3 | GA, weak TG | do | 3.9 | 27.5 | 93.3 | 94.7 | 94.9 |
| 4 | Mostly GA | do | 3.7 | 27.1 | 94.7 | 95.9 | 95.2 |
| 5 | do | do | 2.5 | 17.1 | 94.1 | 95.7 | 93.8 |
| 6 | GA, weak TG | Sl. yellow | 4.5 | 6.8 | 93.4 | 95.0 | 95.3 |
| 7 | TG | Light yellow | 21.9 | 0.1 | 53.8 | 58.6 | 61.7 |
| 8 | No enzyme | Dark yellow | 36.4 | | | | |
| 9 | do | Yellow | 23.3 | | | | |
| 10 | Untreated | Dark yellow | 100 | | 90.6 | 92.3 | 91.2 |

[1] GA means glucoamylase, TG means transglucosidase.

Introduction of the sample at the bottom of the column produced the following results:

| Sample No. | Sample description | Color | Solids percent of total | Glucoamylase recovery, percent | D.E. at— | |
|---|---|---|---|---|---|---|
| | | | | | 47 hours | 72 hours |
| 1 | Untreated | Dark yellow | 100 | 100 | 92.5 | 93.3 |
| 2 | Some GA,[1] heavy TG [1] | None | 1.2 | 4.0 | 83.4 | 84.6 |
| 3 | Some GA, weak TG | do | 2.1 | 21.5 | 93.7 | 95.1 |
| 4 | Only GA | do | 5.3 | 50.5 | 96.3 | 97.4 |
| 5 | GA, weak TG | do | 3.6 | 16.2 | 95.7 | 97.6 |
| 6 | Weak GA, TG | do | 3.1 | 1.9 | 90.2 | 92.2 |
| 7 | TG | do | 7.9 | 0.7 | 39.1 | 43.2 |
| 8 | TG and GA (?) | Sl. yellow | 2.3 | 0.1 | 28.7 | 31.2 |
| 9 | No enzyme | Dark yellow | 63.9 | | | |
| 10 | do | Light yellow | 10.6 | | | |
| Total | | | 100.0 | 94.9 | | |

[1] GA means glucoamylase, TG means transglucosidase.

The length of the filtration column was reduced to 13 inches and the same amount of sample was applied again to the bottom of the column. The water eluant was fed to the bottom also from a reservoir mounted 40″ above the column. The results were as follows:

| Sample No. | Sample description | Color | Solids, percent of total | Glucoamylase Recovery, percent | D.E. at 47 hours | D.E. at 71 hours |
|---|---|---|---|---|---|---|
| 1 | Untreated | Dark yellow | 100 | 100 | 90.2 | 91.6 |
| 2 | Some GA,[1] heavy TG[1] | None | 0.64 | 1.94 | 80.3 | 80.4 |
| 3 | Some GA, heavy TG | do | 1.34 | 4.97 | 83.1 | 84.8 |
| 4 | GA, TG | do | 1.84 | 12.77 | 90.9 | 90.6 |
| 5 | GA, light TG | do | 8.55 | 76.09 | 96.2 | 95.4 |
| 6 | Light GA, TG | do | 2.35 | 3.04 | 94.7 | 93.1 |
| 7 | TG | Dark yellow | 58.32 | 0.43 | | |
| 8 | No enzyme | Yellow | 26.94 | | | |
| Total | | | 99.98 | 99.24 | | |

[1] GA means glucoamylase. TG means transglucosidase.

*Example VI*

A 1″ x 7″ filtration column was filled with Sephadex G-200 gel. The pH was adjusted to 4.2 and 10 milliliters of a glucoamylase-containing enzyme preparation passed through the column. Good enzyme separation was obtained.

The foregoing description and examples demonstrate the advantages of the invention whereby glucoamylase enzymes can be recovered substantially free of transglucosidase from crude fungal enzyme preparations containing both enzymes. Not only is transglucosidase removed by means of the present invention, but undesired color and inert solids are also removed to yield very pure glucoamylase enzymes which afford high conversion of starch to dextrose.

Those modifications and equivalents which fall within the spirit of the invention and the scope of the appended claims are to be considered part of the invention.

I claim:

1. A process of treating a transglucosidase and glucoamylase-containing fungal enzyme preparation which comprises contacting said fungal enzyme preparation with a hydrophilic water-insoluble cross-linked dextran polymer gel having a water regain value substantially greater than 7.5, washing said gel with an eluant, recovering from said gel a fraction consisting of a mixture of glucoamylase and transglucosidase and then recovering from said gel a fraction containing glucoamylase substantially free of transglucosidase.

2. The process of claim 1 wherein the eluant is distilled water.

3. The process of claim 1 wherein the eluant is an aqueous solution of an inorganic salt.

4. The process of claim 1 wherein there is employed a hydrophilic water-insoluble cross-linked dextran polymer gel having a water regain value of about 10.

5. The process of claim 1 wherein there is employed a hydrophilic water-insoluble cross-linked dextran polymer gel having a water regain value of about 20.

6. A process of treating a transglucosidase and glucoamylase-containing fungal enzyme preparation which comprises contacting said fungal enzyme preparation with a hydrophilic water-insoluble cross-linked dextran polymer gel having a water regain value substantially greater than 7.5, washing said gel with an eluant, recovering from said gel a first fraction consisting substantially of transglusosidase and then recovering from said gel a second fraction consisting of a mixture of glucoamylase and transglucosidase and finally recovering from said gel a third fraction containing glucoamylase substantially free of transglucosidase.

References Cited by the Examiner

UNITED STATES PATENTS

| 3,042,584 | 7/1962 | Kooi et al. | 195—31 |
| 3,255,094 | 6/1966 | Mather et al. | 195—66 |
| 3,256,158 | 6/1966 | White | 195—66 |

OTHER REFERENCES

Flodin, P., "Dextran Gels and Their Application in Gel Filtration," 1962, pages 61 to 71 relied on, published by Meijels Bokindustri 1963 (available from AB Pharmacia, Uppsala, Sweden).

Pazur, J. H., et al., article in Journal of Biological Chemistry, vol. 234, No. 8, August 1959, pages 1966–1970.

Sephadex Literature References, No. 1, 1965, pages 17 to 23 (available from AB Pharmacia, Upsala, Sweden).

A. LOUIS MONACELL, *Primary Examiner.*

L. M. SHAPIRO, *Assistant Examiner.*